United States Patent [19]

Andersen

[11] Patent Number: 4,471,092

[45] Date of Patent: Sep. 11, 1984

[54] IMPACT RESISTANT POLYMER WITH IMPROVED FLOW CHARACTERISTICS

[75] Inventor: Paul G. Andersen, Southbury, Conn.

[73] Assignee: Uniroyal, Inc., New York, N.Y.

[21] Appl. No.: 471,964

[22] Filed: Mar. 3, 1983

[51] Int. Cl.$^3$ ............................ C08F 8/00; C08J 3/00; C08L 51/04

[52] U.S. Cl. ........................................ 525/86; 525/53; 525/322

[58] Field of Search ............................ 525/53, 86, 322

[56] References Cited

U.S. PATENT DOCUMENTS

| | | | |
|---|---|---|---|
| 3,914,339 | 10/1975 | Shima et al. | 525/324 |
| 4,166,081 | 8/1979 | Fournier, Jr. et al. | 525/86 |
| 4,202,948 | 5/1980 | Peascoe | 525/86 |

FOREIGN PATENT DOCUMENTS 57-59924  4/1982  Japan .................................. 525/322

*Primary Examiner*—Allan Lieberman
*Attorney, Agent, or Firm*—Bert J. Lewen; James J. Long

[57] ABSTRACT

An olefin copolymer rubber graft composition having a viscoelastic performance index of not greater than 100 as defined by the expression $$PI = (DS \times MV)/i.v.$$

where DS is the die swell of the composition, MV is the melt viscosity of the composition and i.v. is the intrinsic viscosity of a resinous portion extracted from the composition.

4 Claims, 3 Drawing Figures

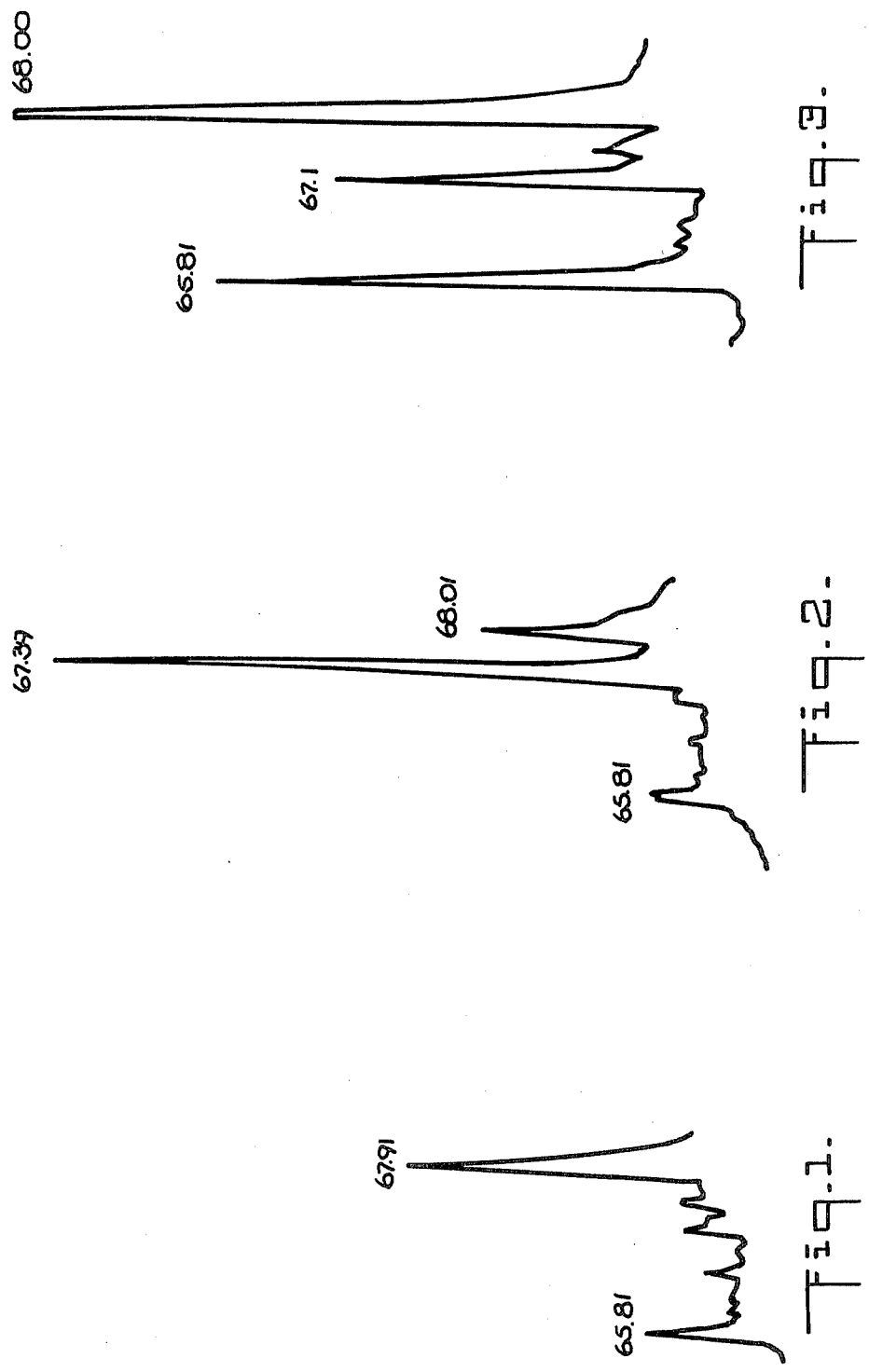

IMPACT RESISTANT POLYMER WITH IMPROVED FLOW CHARACTERISTICS

This invention relates to an impact resistant polymer composition having improved flow characteristics.

The invention will be described with reference to the accompanying drawing wherein:

FIG. 1 is a graphical representation of a gas chromatographic pyrogram of a composition of the invention;

FIGS. 2 and 3 represent gas chromatographic pyrograms of prior art materials.

The viscoelastic properties of a polymeric material are very important parameters in determining just how well it will process (i.e., extrude, calender, injection mold, etc.). The more elastic a material is, the more difficult it is to process because it has a memory of previous stresses and strains which it has been subjected to. These could cause post processing problems such as nerve or dimensional instability in the extruded sheet when it is subsequently fabricated, or stress cracking in injected molded parts. The more viscous a material is, the more power is consumed in processing since additional energy is required for melt transport and for external heating. Processing at elevated temperature could then cause the material to partially degrade. Also, flow is especially important in injection molding because the more viscous a material is, the more difficult it becomes to fill an intricate mold cavity even at elevated temperatures.

The viscoelastic properties of two-phase polymeric materials are generally a weighted average of the properties of the individual components, depending on the relative amount of each material present. This is true in the case of a resinous material such as SAN (styrene-acrylonitrile resin) which has been impact modified by a compatible resin grafted rubber. The grafted rubber portion has a tremendous influence on the processability of the resulting two-phase system. Even though it may be only 15 to 35% of the total material, if the graft is highly elastic and/or viscous, then the total material will also have a high elastic component and be stiff flowing. Attempts to improve processing characteristics by changes in the added SAN, tend to lead to deterioration of other properties. One way to improve flow is to lower the viscosity (i.e., lower molecular weight) of the continuous resin phase. However, if the viscosity (or MW) is lowered too much the material will lose its physical properties such as mechanical strength, resistance to UV radiation, etc.

In one aspect, the subject of this invention is a grafted olefinic rubber impact modified SAN resin (OSA) which has been developed with the following advantages:

1. Ease of processing
2. High impact strength

Although ease of processing and high impact strength are desirable properties for a plastic, only impact strength lends itself to a simple, straightforward measurement. Measurements of impact strength such as notched Izod impact and falling dart impact are well known. Quantification of processing ease is somewhat more difficult since processability is largely determined by the combination of flow and melt elasticity as already discussed.

To quantify the processability of a plastic, we have defined a "processing index," PI, according to the expression:

$$PI = (DS \times MV)/i.v.$$

where DS is the die swell (ratio of extrudate diameter to die diameter) of the material, MV is the melt viscosity of the material expressed in poises $\times 10^{-3}$, and i.v. is the intrinsic viscosity of the resin expressed in deciliters per gram, the said die swell and melt viscosity being measured on a Sieglaff-McKelvey rheometer at a shear rate of 32 reciprocal seconds and at a temperature of 400° F., and the said intrinsic viscosity being measured in dimethylformamide at 30° C. For purposes of the invention the defined processing index, PI, should not be greater than 100. The compositions of the invention contain from 0 to 80% by weight (preferably from 20 to 45%) of added separately prepared resin, having an intrinsic viscosity of from 0.55 to 1.0 (preferably 0.62 to 0.78) in dimethyl formamide at 30° C., and the over all final rubber level of the composition is from 18 to 40% by weight (preferably 20 to 30%).

The processing index is a dimensionless quantity tha combines melt elasticity (die swell) and a kind of "normalized" viscosity, namely, the ratio of the melt viscosity of the entire plastic composition to the intrinsic solution viscosity of the free (ungrafted) SAN resin component. Such "normalization" of the viscous component effectively removes the contribution of the ungrafted SAN and maximizes the contribution of the graft per se. The graft component is, of course, responsible for the impact strength of these compositions, but as previously discussed, can be responsible for many of the processing difficulties with previous blends of this type.

We have observed that materials with a PI of 100 or less tend to have improved flow in complex molds, improved gloss and higher knit-line strength in injection molding, and have reduced surface waviness or "nerve" in extruded parts. When the PI rises significantly above 100, say to 125 or more, the materials tend toward more difficult mold fill, lower gloss, poorer knit-line strength and increased surface waviness.

A typical composition of the invention comprising graft olefinic rubber impact modified SAN resin contains less than half the amount of styrene-styrene-acrylonitriletrimer fragments, as evidenced by gas chromatographic pyrogram data, in comparison to certain conventional grafted olefinic rubber modified SAN compositions.

The composition of the invention may be produced by the method described in my copending application Ser. No. 441,122, filed Nov. 12, 1982, the disclosure of which is hereby incorporated herein by reference.

In one aspect, the invention is directed to an improved thermoplastic OSA graft copolymer composition of the kind described in U.S. Pat. No. 4,202,948, Peascoe, May 13, 1980 based on a graft copolymer of resin-forming monomers (viz., monoethylenically unsaturated resin-forming material, e.g., styrene-acrylonitrile) on EPDM type of rubber (especially a terpolymer of ethylene, propylene and a copolymerizable non-conjugated diene). The several known forms of such graft copolymer compositions suffer from poor flow characteristics and excessive elasticity, with consequent difficulties in processing. If it is attempted to improve the flow properties by decreasing the molecular weight (viscosity) of the resin, it is unfortunately found that the physical properties of the composition become inferior. One object of the invention is to improve flow and reduce elasticity without impairing physical properties.

To prepare a composition of the invention, a polymer which is to serve as the spine of the graft copolymer is fed continuously into an enclosed passageway, particularly an extrusion passageway wherein the polymer is advanced and worked continuously. The spine polymer is ordinarily an unsaturated material, especially an unsaturated rubber, although saturated polymer may also be used. Various screw extrusion devices are suitable, such as twin screw extruder-mixers.

Provision is made for the introduction of grafting material to the spine polymer in the extrusion passageway. Ordinarily the grafting material to be reacted with the spine polymer is a volatile or gaseous material, such as one or more liquid monomers capable of graft copolymerizing with the spine polymer.

In the process the spine polymer does not completely fill the extrusion passageway. To prevent the grafting material, which is introduced under pressure downstream of the point of introduction of the spine polymer, from backing up in the extrusion passageway, a sealing zone is established between the point of introduction of the spine polymer and the point of introduction of the grafting material. The sealing zone is established by locally retarding the forward flow of the spine polymer and compacting it so as to completely fill the extrusion passageway with the spine polymer. In effect, a solid plug of spine polymer is thus formed in the sealing zone; the grafting material introduced downstream of the sealing zone cannot move upstream beyond the sealing zone. The grafting material is thus prevented from escaping through the entrance hopper where the spine polymer is initially introduced.

The spine polymer and grafting material are mixed together and advanced through the extrusion passageway by the action of the extruder screws, under graft copolymerization conditions, with the result that a substantial portion of the grafting material becomes graft copolymerized on the spine polymer, forming a graft copolymer mass which is subsequently discharged from the extrusion passageway, ordinarily through a suitable die.

It will be understood that in a typical graft copolymerization process not all of the grafting material actually becomes chemically attached to the spine polymer. That portion of the grafting material which does not graft copolymerize either polymerizes with itself or remains unreacted. The graft copolymer mass is thus typically composed in part of true graft copolymer and partly of polymer formed by polymerization of the grafting monomers with themselves in addition to unreacted monomer(s).

To remove unreacted monomer(s) from the graft copolymer mass, vacuum may be applied to the extrusion passageway prior to the point at which the graft copolymer mass is expelled from the die.

In accordance with typical practice, the graft copolymer (e.g., an OSA graft copolymer) is blended with further separately prepared resin (e.g., styrene-acrylonitrile resin) under fluxing conditions to produce for example a gum plastic having a continuous resinous phase in which a rubber graft copolymer phase is dispersed. A particularly desirable method for doing this is to pass the graft copolymer mass directly from the above-described extrusion passageway into a second screw extruder mixer directly connected to the first extruder. The second extruder acts analogously to the first extruder, that is, the polymer mass incompletely fills the second extrusion passageway. The additional polymer, typically a resin, is introduced to the second extrusion passageway upstream from the point where the graft polymer is introduced. To prevent volatile material (particularly any residual unreacted monomer in the graft copolymer mass) from backing up in the second extruder, a seal is provided between the point at which graft copolymer is introduced and the point at which the additional resin is introduced. As in the first extruder, the seal takes the form of a solid mass or plug of polymer created in the second extrusion passageway by retarding the flow of polymer and compacting it into a solid mass which completely fills the extrusion passageway in the sealing zone.

In the continuation of the second extrusion passageway downstream from the sealing zone the mixture of graft copolymer and separately prepared resin only partially fills the extrusion passageway. The polymers are kneaded together at elevated temperature (e.g., 100° C. or less to 275° C. or more) under conditions such that continued polymerization of unreacted monomers takes place. The blend is advanced to an exit die where the mixture is discharged for further processing.

It will be understood that as a result of the grafting reaction the rubber spine polymer becomes compatibilized with the added resinous material. The graft copolymerization mass produced in the first extrusion passageway has a continuous resin phase or a continuous rubber phase, depending on the relative proportions of monomers and rubber, and the degree of conversion of monomers. In the second extrusion passageway the continuous phase may become the discontinuous phase.

Vacuum may be applied to the second extrusion passageway prior to discharge of the blend to remove any unreacted monomers. The discharged product may be used to make useful shaped articles of all sorts by such conventional processes as molding (compression, transfer or injection), calendering, extrusion, laminating, etc.

The composition of the invention may be based on graft copolymer prepared from any olefin copolymer rubber spine suitable for graft copolymerization. Usually the olefin copolymer rubber is based on ethylene and propylene ("EPR") with or without additional monomers. Particularly suitable are the terpolymeric forms of EPR, known as "EPDM", in which the third monomer is a non-conjugated diene such as dicyclopentadiene ("DCPD"), ethylidene norbornene ("ENB"), hexadiene, etc. Such EPDM's are unsaturated. However, third monomers other than non-conjugated dienes, such as phenyl norbornene, may also be used. Also suitable as the EPR is a binadry copolymer of ethylene and propylene, known as "EPM". If desired, more than one spine polymer may be used (e.g., a mixture of two or more rubbers). In a preferred practice, a small, effective amount of an antioxidant is added to the spine polymer.

The grafting material may comprise any suitable conventional grafting material which will graft polymerize with the spine polymer employed. Usually the grafting material is a volatile liquid monomer or a gaseous monomer. Particularly useful are such vinyl aromatic monomers as styrene or substituted styrenes (e.g., alpha-methyl styrene) and such alkenoic monomers as alkenoic nitriles, esters and acids, or mixtures of such monomers. If desired solid monomers may be used, such as maleic anhydride (which is ethylenically unsaturated), conveniently in molten form or in the form of a solution (e.g., a solution in styrene).

If a separately prepared polymer is blended with the graft copolymer mass, such separate polymer may be for example a resin based on the same monomers as used in the grafting reaction, or a resin based on different monomers.

If desired, the grafting material may be employed in partially polymerized form. For example, a partially polymerized (low conversion) styrene-acrylonitrile copolymer, still containing substantial amounts of unreacted styrene and acrylonitrile, may be used as the grafting material.

The relative proportions of rubber spine and grafting material may vary from as little as 18 parts (by weight) to as much as 80 parts of rubber and correspondingly 82 parts to 20 parts of grafting material. Frequently approximately one part of rubber per two parts of grafting material are present in the graft copolymerization mass.

As in conventional practice, the graft copolymerization reaction is brought about by a free-radical polymerization initiator or catalyst employed in a small but effective amount (e.g., from 0.01 to 5 percent by weight of the grafting material). The initiator is conveniently added in admixture with the monomeric charge, although it may also be added separately.

It will be understood that the graft copolymerization is brought about by heating the mass to a temperature sufficiently elevated to decompose or activate the polymerization initiator. A suitable graft copolymerization temperature in any given case will depend largely on the particular initiator employed, as in conventional practice. In many cases a temperature within the range of 100° C. to 275° C. is suitable.

The polymerization initiator is frequently an organic peroxygen compound or other type of compound capable of generating free radicals. A mixture of two or more initiators may be employed. Particularly suitable are organic peroxide polymerization catalysts which have a half life of at least 5 minutes as determined by the decomposition rate in benzene at 100° C. Some suitable compounds are tert-butyl perbenzoate, tert-butyl hydroperoxide, di-tert- butyl peroxide, benzoyl peroxide, and tert-butyl peroctoate and azobisisobutyronitrile.

It may be desirable to add other material along with the spine or grafting material (e.g., U.V. stabilizer, pigments, etc.).

The time of dwell of the graft copolymerization mass in the extrusion passageway will of course be sufficient to bring about the desired degree of conversion of monomers.

The amount of additional separately prepared resin added to the product of the graft copolymerization step may range from 0 to 80%, preferably from 20 to 45%. The intrinsic viscosity of the added separately prepared resin is from 0.55 to 1.0, preferably from 0.62 to 0.78 (in dimethyl formamide at 30° C.). The final rubber level of the composition of the invention is from 18 to 40%, preferably 20 to 30%.

EXAMPLE 1

This example illustrates the preparation of graft copolymer by a mass graft copolymerization process in a twin screw extruder-mixer (see Example 2 of Ser. No. 441,122).

A 42 to 1 L/D 30 mm diameter, corotating twin screw extruder consisting of fourteen 3 to 1 L/D barrel sections operating at 250 rpm is used with a solids feed port in the first 3 to 1 L/D section, a liquid feed port at the third 3 to 1 L/D section, and a vent port at the 13th 3 to 1 L/D section, having five separate and distinct heating and cooling zones in the main extruder and a separate heating zone for the die which sits after the 14th 3 to 1 L/D barrel section. The temperature profile for the heating zones is as follows:

| Zone 1 | Zone 2 | Zone 3 | Zone 4 | Zone 5 | Zone 6 |
| --- | --- | --- | --- | --- | --- |
| 215° C. | 165° C. | 175° C. | 210° C. | 210° C. | 200° C. |
| Barrel Section 2 | Barrel Sections 4–6 | Barrel Sections 7–9 | Barrel Sections 10–11 | Barrel Sections 12–14 | Die |

The two feed zone barrels are neither heated nor cooled.

The extruder screw configuration is constructed so that a dynamic seal is formed between the first and third barrel sections to keep the liquid feed, which builds up a high pressure after it is injected but before it can be incorporated into the rubber, from traveling back to the solids feed port while allowing the solid feed to pass through to the liquid feed section. This is achieved by assembling a series of screw elements which counteract this pressure and set up a overall proper pressure gradient between the solid feed and liquid feed zones. The seal is constructed from six elements in series, first two positive pitch kneading elements to provide forwarding pressure, then a neutral kneading element which has neutral pitch and tends to fill up with material. These three elements are followed by a negative or reversed pitch kneading element which opposes the flow of material from the solid to liquid feed port then a positive and finally another negative pitch kneading element. The proper balance of positive and negative forces keeps the elements full and material flowing in the appropriate direction.

For example, the first two positive pitch elements may comprise kneading blocks described by the expression

KB45/5(20), meaning that the blocks (discs) have an angle of 45° between each successive one, and that there are five discs with a total length of 20 mm. The neutral kneading element may comprise for example blocks described by the expression

KB90/5(28), meaning that there are 5 discs have an angle of 90° between each successive disc, and having a total length of 28 mm. The negative or reversed pitch element may for example comprise a kneading block characterized by the expression

KB45/5(14)$_L$;

meaning that the discs have an angle of 45° between each successive one in the opposite rotational sense to positive pitch elements, and that there are five discs with a total length of 14 mm. The next positive kneading block may be as described previously while the final negative pitch section may be for example as described above.

The rest of the screw is constructed in a similar manner to provide a balance of positive and negative kneading and conveying elements which overcome any localized pressure buildup to maintain a steady uniform flow of material.

A composition of the invention may be prepared in the described device as follows:

One part of rubber (ethylene-propylene-dicyclopentadiene terpolymer, ethylene/propylene weight ratio 66/34, Mooney viscosity 42 [ML-4 at 121° C.], iodine number 10) dusted with 0.01 part antioxidant (Irganox 1035/1093 [trademark]) is starve fed into the solids feed port by a K-tron (trademark) twin-screw feeder while 2 parts of monomer (mixture of styrene and acrylonitrile in 67/33 weight ratio) containing 0.005 part of initiator (di-t-butyl peroxide) is simultaneously pumped under pressure into the liquid feed port to give a total feed rate of approximately 5 pounds per hour. The rubber is fluxed and dynamic seal set up on the barrel section between the two feed ports and is dispersed in the monomer by high shear following its introduction at the liquid feed port. The suspension of incompatible rubber in monomer is then compatibilized through the onset of polymerization of the styrene-acrylonitrile monomer in which at least some part of the monomer is grafted onto the rubber while the balance of monomer is homopolymerized or copolymerized. This polymerization proceeds to increased conversion as the material proceeds down to extruder until it reaches the vent port where any unreacted monomer is removed to be recycled into the liquid feed. The reacted material then proceeds to the die where it is extruded and pelletized.

The resulting material contains approximately 35% rubber and 65% styrene-acrylonitrile where the styrene-acrylonitrile is continuous phase. This material is subsequently mixed with additional styrene-acrylonitrile resin to get the desired rubber level, typically 20-23%. This can be done in any one of several plastic compounding or mixing type equipment such as a single-screw or multiple-screw extruder, or a batch mixer. In this case grafted material was mixed with Dow Tyril 880 (trademark) on a Haake Torque Rheometer (trademark) with a mixing head and cam rotors. Samples for mechanical property testing (notched Izod at room temperature and −20° F. [ft-lb/in of notch] and hardness [Rockwell R]) were cut from ⅛ inch compression molded plaques.

Table I below shows the composition of four samples of material of the invention, namely, samples A, B, C, and D, prepared by mass grafting in an extruder as above. Also shown in the table are a number of comparison materials which are outside the scope of the invention. Comparison materials E to J were prepared by a suspension grafting process and sample K was prepared by a prior art mass grafting process as in U.S. Pat. No. 4,202,948, May 13, 1980, Peascoe. Sample L is an OSA made by Japan Synthetic Rubber, AES 110 (trademark). Samples M and N are commercial materials made by Uniroyal, "Rovel" (trademark) 701 and 703, respectively.

Table II shows die swell and melt viscosity data for various compositions as well as intrinsic viscosity data. The table also shows the performance index (PI) as determined by the expression $$(DS \times MV)/i.v.$$

where DS is the die swell of the composition MV is the melt viscosity of the composition expressed in poises $\times 10^{-3}$, and i.v. is the intrinsic viscosity of the resinous portion expressed in deciliters per gram, the said die swell and melt viscosity being measured on a Sieglaff—McKelvey rheometer at a shear rate of 32 reciprocal seconds and at a temperature of 400° F., and the said intrinsic viscosity being measured in dimethyl formamide at 30° C. Table II also shows significant physical properties of the compositions, particularly hardness and impact strength. As indicated samples A to D represent the practice of the invention, whereas samples E to O represent comparison materials.

The die swell data in Table II represent the ratio of extrudate diameter to die diameter, obtained with a die 1/16 inch in diameter and ¼ inch in length. The Rockwell R hardness and the notched impact strength were obtained according to ASTM procedures (at room temperature [NIRT] and at −20° F.). These measurements were made on ⅛" compression molded samples.

The intrinsic viscosities (i.v.) shown in Table II are the intrinsic viscosities of resin recovered from the sample by extracting the sample with acetone and then evaporating to dryness. The actual i.v. measurement is made in dimethyl formamide at 30° C.

Table II shows that the samples representing the invention (A to D) have a performance index ("PI") as previously defined of not greater than 100, and they have good hardness and high impact strength. The comparison materials either have a PI greater than 100 with consequent inferior processing, or, if an attempt is made to lower the PI by lowering the rubber content or using a resin having a lower intrinsic viscosity, then the comparison materials have poor properties. Only the materials of the invention having a PI not greater than 100 have good processing along with good properties. The commercial samples and the comparison examples have good impact only when the PI values are greater than 100. If the PI values are reduced through lowering the rubber level or addition of low viscosity resin then the resulting materials have poor impact strength.

Referring to the drawing, it will be seen that the gas chromatographic pyrogram of a composition of the invention (sample B described above) as shown in FIG. 1 is significantly different from the gas chromatographic pyrograms of prior art materials E (FIG. 2) and L (FIG. 3).

The FIG. 1 pyrogram for the invention composition B indicates that it contains not more than two-fifths as much styrene-styrene-acrylonitrile trimer fragments as are contained in the prior art materials E (FIG. 2) and L (FIG. 3).

To provide the pyrograms shown in the drawing, a sample of the composition is first extracted with acetone (to remove free [ungrafted] styrene-acrylonitrile resin) and then extracted with hexane (to remove free [ungrafted] rubber), leaving a "pure" (containing only grafted rubber) graft component (insoluble in both acetone and hexane). This pure graft is pressed into a sheet 3/1000 inch thick using a steam press at 360° F. The equipment used to characterize the sample is a pyroprobe-capillary gas chromatograph-mass spectrometer connected in sequence. A 0.3 mg sample is taken and inserted into the pyroprobe directly. The pyroprobe in a Chemical Data System Pyroprobe 120 [trademark] operated under the following conditions:

Type Probe Used: Platinum coil (0.3 mg sample)
Interface Temperature: 230° C.
Ramp: 20°/msec Interval: 5 sec
Pyrolysis Temperature: 600° C.
The gas chromatograph conditions are as follows:
 Column: Quadrex [trademark]
 Length: 50 m
 Inside Diameter: 0.24 mm
 Liquid Phase: SLP OV-101 [trademark]
 Carrier Gas: Helium
 Flow: 2.3 ml/min
The column program is as follows:
 Temp. 1: 50° C.
 Time 1: 1 min
 Rate: 3°/min
 Temp 2: 250° C.
 Time 2: 5.4 min
The mass spectrogram (GC/MS instrument model 5985B Hewlett-Packard [trademark]) conditions are as follows:
 MS mode: EI
 Voltage: 70 eV
 Electron Multiplier Voltage: 2000 V
 Emission Current: 300 A
 Scan Range: 2
 Threshold: 5
 Vacuum: $3 \times 10^{-6}$ All peaks are expressed relative to styrene taken as 1000.0. The samples examined differ significantly in the portion of the pyrogram representing a styrene-styrene-acrylonitrile trimer.

TABLE I

Composition of OSA Grafts of SAN (72/28) Resin on EPDM Rubber

| | Starting Rubber | | | | % Separately Prepared Added Resin in Composition | i.v. of Added Resin | % Rubber in Finished Material |
|---|---|---|---|---|---|---|---|
| | Diene | E/P Ratio | I₂# | ML-4 121° C. | | | |
| A | DCPD | 72/28 | 20 | 67 | 34 | .75 | 23 |
| B | DCPD | 66/34 | 10 | 42 | 34 | .75 | 23 |
| C | DCPD | 72/20 | 20 | 67 | 34 | .75 | 23 |
| D | ENB | 60/40 | 20 | 60 | 34 | .75 | 23 |
| E | DCPD | 72/28 | 20 | 67 | 54 | .65 | 23 |
| F | DCPD | 72/28 | 20 | 67 | 48 | .65 | 23 |
| G | ENB | 60/40 | 20 | 60 | 49.5 | .65 | 23 |
| H | ENB | 60/40 | 20 | 60 | 62.7 | .65 | 17 |
| I | ENB | 60/40 | 20 | 60 | 49.5 | .52 | 23 |
| J | ENB | 60/40 | 20 | 60 | 62.7 | .52 | 17 |
| K | ENB | 60/40 | 20 | 60 | 52 | .75 | 23 |
| L | — | — | — | — | — | — | — |
| M | — | — | — | — | — | — | — |
| N | — | — | — | — | — | — | — |

TABLE II

Properties of Compositions Based on OSA Grafts of SAN (72/28) Resin on EPDM Rubber

| Sample | Die Swell | MV × 10⁻³ Poises | i.v. | PI | Rockwell R | NIRT | NI −20° F. |
|---|---|---|---|---|---|---|---|
| A | 1.18 | 41.8 | .58 | 85 | 94 | 11.0 | 1.65 |
| B | 1.13 | 35.1 | .50 | 77.8 | 90 | 8.3 | 2.1 |
| C | 1.18 | 39.1 | .57 | 80.9 | 93 | 13.3 | 2.1 |
| D | 1.27 | 44.5 | .57 | 92.1 | 88 | 12.3 | 1.27 |
| E | 1.37 | 55.3 | .58 | 130.1 | 95 | 14.0 | 2.1 |
| F | 1.31 | 64.7 | .58 | 146.1 | 97 | 14.4 | 2.2 |
| G | 1.36 | 53.9 | .57 | 128.6 | 93 | 14.6 | 3.1 |
| H | 1.37 | 41.8 | .57 | 100 | 106 | 4.0 | 1.4 |
| I | 1.34 | 47.2 | .54 | 117 | 94 | 13.5 | 2.8 |
| J | 1.34 | 40.4 | .53 | 93.6 | 107 | 3.2 | 1.3 |
| K | 1.28 | 59.0 | .63 | 120 | 88 | 16.3 | 1.8 |
| L | 1.23 | 43.1 | .48 | 110 | 90 | 9.1 | 2.7 |
| M | 1.34 | 48.5 | .59 | 110 | 89 | 12.2 | 2.8 |
| N | 1.34 | 47.2 | .54 | 117 | 94 | 13.0 | 2.8 |

What is claimed is:

1. An impact resistant thermoplastic polymer composition with improved flow characteristics having a grafted olefin copolymer rubber portion and a resinous portion, said graft copolymer having been produced by graft copolymerizing monoethylenically unsaturated polymerizable resin-forming monomeric material on said rubber, and said composition having a viscoelastic performance index of not greater than 100 as defined by the expression $$DS \times MV / i.v.$$

where DS is the die swell of the composition expressed as the ratio of the extrudate diameter to the die diameter, MV is the melt viscosity of the composition expressed in poises $\times 10^{-3}$ and i.v. is the intrinsic viscosity of the ungrafted resinous portion extracted from the composition expressed in deciliters per gram, the said die swell and melt viscosity being measured on a Sieglaff-McKelvey rheometer at a shear rate of 32 reciprocal seconds and at a temperature of 400° F., and the said intrinsic viscosity being measured in dimethyl formamide at 30° C., the said composition containing from 0 to 80% by weight of added separately prepared resin, said added resin having an intrinsic viscosity of from 0.55 to 1.0 in dimethyl formamide at 30° C., the overall rubber level being from 18 to 40% by weight.

2. A composition as in claim 1 in which the olefin copolymer is an EPR bipolymer of terpolymer and the resin is styrene-acrylonitrile.

3. A composition as in claim 1 containing from 20 to 45% of added separately prepared resin, said added resin having an intrinsic viscosity of from 0.62 to 0.78 in dimethyl formamide at 30° C., the overall rubber level being from 20 to 30%.

4. A composition as in claims 1 or 3 in which the olefin copolymer rubber is EPDM and the resin is styrene-acrylonitrile.

* * * * *